US008936187B2

(12) United States Patent
Hino

(10) Patent No.: US 8,936,187 B2
(45) Date of Patent: Jan. 20, 2015

(54) CONNECTING METHOD OF SINGLE CORE ELECTRIC WIRE TO STRANDED ELECTRIC WIRE

(71) Applicant: Yazaki Corporation, Tokyo (JP)

(72) Inventor: Fumie Hino, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/224,185

(22) Filed: Mar. 25, 2014

(65) Prior Publication Data

US 2014/0203068 A1 Jul. 24, 2014

Related U.S. Application Data

(63) Continuation of application No. PCT/JP2012/075578, filed on Sep. 26, 2012.

(30) Foreign Application Priority Data

Sep. 26, 2011 (JP) ................................ 2011-208930

(51) Int. Cl.

*B23K 20/12* (2006.01)
*H01R 43/02* (2006.01)
*H01R 4/02* (2006.01)
*H01R 4/62* (2006.01)

(52) U.S. Cl.

CPC ............ *H01R 43/02* (2013.01); *H01R 43/0207* (2013.01); *H01R 4/021* (2013.01); *H01R 4/62* (2013.01)
USPC ..................... 228/112.1; 228/114.5; 228/138; 228/180.5

(58) Field of Classification Search

None
See application file for complete search history.

(56) References Cited

U.S. PATENT DOCUMENTS

| | | | | |
|---|---|---|---|---|
| 2,751,570 | A * | 6/1956 | Broske | 439/730 |
| 2,815,497 | A * | 12/1957 | Redslob | 439/203 |
| 3,328,874 | A * | 7/1967 | Davis et al. | 228/129 |
| 3,576,067 | A | 4/1971 | Loyd et al. | |
| 3,626,363 | A | 12/1971 | McIver et al. | |
| 3,996,417 | A * | 12/1976 | Annas | 174/90 |

(Continued)

FOREIGN PATENT DOCUMENTS

| | | | |
|---|---|---|---|
| CZ | WO 00/35051 A1 | * | 6/2000 |
| DE | 620829 C | * | 10/1935 |

(Continued)

OTHER PUBLICATIONS

International Search Report (PCT/ISA/210), dated Jan. 23, 2013, issued by the International Searching Authority in counterpart International Patent Application No. PCT/JP2012/075578.

*Primary Examiner* — Kiley Stoner
(74) *Attorney, Agent, or Firm* — Sughrue Mion, PLLC

(57) ABSTRACT

A connecting method of a single core electric wire to a stranded electric wire which can prevent a contact resistance from increasing is provided. The connecting method includes a tube inserting process that a single core wire and a twisted wire are respectively inserted from openings and of a tubular joint terminal having a single core wire inserting part from an end part to a prescribed position in an interior side and a twisted wire inserting part from the other end part to the single core wire inserting part in the interior side, and a metallic bond process that an end face contacts under pressure with an end face and the single core electric wire is rotated in a twisting direction of the twisted wire to metallically bond the end faces.

4 Claims, 9 Drawing Sheets

(56) References Cited

U.S. PATENT DOCUMENTS

| | | | | |
|---|---|---|---|---|
| 5,408,743 | A * | 4/1995 | Tournier et al. | 29/863 |
| 5,906,044 | A * | 5/1999 | Fujii et al. | 29/860 |
| 6,246,001 | B1 * | 6/2001 | Fukui | 174/78 |
| 6,538,203 | B1 | 3/2003 | Nölle et al. | |
| 2009/0218134 | A1 * | 9/2009 | Stroh et al. | 174/74 R |
| 2010/0175906 | A1 * | 7/2010 | Takayama | 174/59 |
| 2010/0178785 | A1 * | 7/2010 | Takayama | 439/98 |
| 2011/0168423 | A1 * | 7/2011 | Hagi et al. | 174/34 |
| 2013/0008714 | A1 * | 1/2013 | Morikawa et al. | 174/74 R |
| 2013/0146644 | A1 * | 6/2013 | Ruhl et al. | 228/110.1 |
| 2013/0199841 | A1 * | 8/2013 | Lehmann | 174/75 R |
| 2013/0293045 | A1 * | 11/2013 | Kajita et al. | 310/71 |
| 2014/0134873 | A1 * | 5/2014 | Lehmann | 439/421 |

FOREIGN PATENT DOCUMENTS

| | | | | |
|---|---|---|---|---|
| DE | 202007015721 | U1 * | 4/2008 |
| JP | 03108289 | A * | 5/1991 |
| JP | 2005-227003 | A * | 8/2005 |
| JP | 2009-21148 | A * | 1/2009 |

* cited by examiner

CONNECTING METHOD OF SINGLE CORE ELECTRIC WIRE TO STRANDED ELECTRIC WIRE

CROSS REFERENCE TO RELATED APPLICATIONS

This application is a continuation of PCT application No. PCT/JP2012/075578, which was filed on Sep. 26, 2012 based on Japanese Patent Application (No. 2011-208930) filed on Sep. 26, 2011, the contents of which are incorporated herein by reference.

BACKGROUND OF THE INVENTION

1. Field of the Invention

The present invention relates to a connecting method of a single core electric wire to a stranded electric wire by which the single core electric wire having one core wire covered with an insulating coat part is connected to the stranded electric wire having a twisted wire formed by twisting a plurality of element wires which is covered with an insulating coat part.

2. Description of the Related Art

Usually, as a method for connecting together two electric wires having metal wires covered with an insulating coat part, a method is known that the metal wires are exposed by peeling respectively the insulating coat parts of end parts of the electric wires to connect together the exposed metal wires by using a joint terminal. As the joint terminal used in this connecting method, what is called a pressure attaching terminal is mainly used in which pressure attaching pieces are respectively attached under pressure to the metal wires of the electric wires. For instance, PTL 1 proposes a connecting method of a single core electric wire to a stranded electric wire in which the single core electric wire having one core wire (refer it to as a single core wire, hereinafter) covered with an insulating coat part is connected to the stranded electric wire having a twisted wire formed by twisting a plurality of element wires which is covered with an insulating coat part by using a joint terminal as a pressure attaching terminal.

In the joint terminal disclosed in the PTL 1, an end face of the single core wire and an end face of the twisted wire are arranged to face each other in the joint terminal having at least two caulking pieces and caulked by the two caulking pieces to connect the single core electric wire to the stranded electric wire.

CITATION LIST

Patent Literature

[PTL 1] Japanese Patent Publication No. JP-A-2009-21148

SUMMARY OF THE INVENTION

However, in the connecting method of the single core electric wire to the stranded electric wire using the joint terminal disclosed in the patent literature 1, when the joint terminal is attached under pressure to the single core wire and the twisted wire, a load is hardly dispersed in the single core wire. Accordingly, a problem arises that a part is generated in which a contact pressure to the joint terminal is extremely high and that part is liable to be creep deformed after a pressure attaching operation to lower the contact pressure to the joint terminal, so that a contact resistance is increased.

The present invention is devised by considering the above-described problems and it is an object of the present invention to provide a connecting method of a single core electric wire to a stranded electric wire which can prevent a contact resistance from increasing.

According to one aspect of the present invention, there is provided A connecting method of a single core electric wire to a stranded electric wire by which a single core electric wire having a single core wire covered with an insulating coat part is connected to a stranded electric wire having a twisted wire formed by twisting a plurality of element wires which is covered with an insulating coat part, the connecting method of the single core electric wire to the stranded electric wire including:

a tube inserting process in which the single core wire and the twisted wire are respectively inserted from openings of end parts of a tubular joint terminal having a single core wire inserting part which has an inside diameter a little larger than a diameter of the single core wire from one end part of the tubular joint terminal to a prescribed position in an interior side in a direction of an axis of the tubular joint terminal, and a twisted wire inserting part which has an inside diameter a little larger than a diameter of the twisted wire from the other end part to the single core wire inserting part in the interior side in the direction of the axis of the tubular joint terminal; and a metallic bond process in which an end face of the single core wire is allowed to come into contact under pressure with an end face of the twisted wire, with the single core electric wire being rotated in a twisting direction of the twisted wire, or the stranded electric wire being rotated in an opposite direction to the twisting direction, or the single core electric wire being rotated in the twisting direction and the stranded electric wire is rotated in the opposite direction to the twisting direction, to metallically bond the end face of the single core wire to the end face of the twisted wire.

In the connecting method of a single core electric wire to a stranded electric wire according to the above, the tubular joint terminal may be an integrally formed tubular member.

In the connecting method of a single core electric wire to a stranded electric wire according to the above, a terminal caulking process may be further included in which the tubular joint terminal is caulked after the metallic bond process.

In the connecting method of a single core electric wire to a stranded electric wire according to the above, the tubular joint terminal may have tapered parts at both end parts which are formed in tapered shapes so as to enlarge an inside diameter outward of the tube from an inner part of the tube in a direction of an axis.

Advantages Effects of Invention

In the connecting method of the single core electric wire to the stranded electric wire according to one aspect of the present invention, the single core electric wire having the single core wire covered with the insulating coat part is connected to the stranded electric wire having the twisted wire formed by twisting the plurality of element wires which is covered with the insulating coat part. The connecting method of the single core electric wire to the stranded electric wire includes the tube inserting process that the single core wire and the twisted wire are respectively inserted from the openings of the end parts of the tubular joint terminal having the single core wire inserting part formed which has the inside diameter a little larger than the diameter of the single core wire from the one end part of the tubular member to the prescribed position in the interior side in the direction of the axis and the twisted wire inserting part formed which has the inside diameter a little larger than the diameter of the twisted wire from the other end part to the single core wire inserting part in the interior side in the direction of the axis, and the metallic bond process that the end face of the single core wire is allowed to come into contact under pressure with the end face of the twisted wire and the single core electric wire is rotated in the twisting direction of the twisted wire, or the stranded electric wire is rotated in the opposite direction to the twisting direction or the single core electric wire is rotated in the twisting direction and the stranded electric wire is rotated in the opposite direction to the twisting direction to metallically bond the end face of the single core wire to the end face of the twisted wire. Accordingly, since the single core wire is metallically bonded to the twisted wire, a contact resistance can be prevented from increasing.

Further, in the connecting method of the single core electric wire to the stranded electric wire according to one aspect of the present invention, since the tubular joint terminal is the integrally formed tubular member, an outer periphery of a metal connecting part is covered without a seam. Thus, the metal connecting part can be assuredly protected.

Further, in the connecting method of the single core electric wire to the stranded electric wire according to one aspect of the present invention, since the terminal caulking process in which the tubular joint terminal is caulked is further included after the metallic bond process, the tubular joint terminal can be strongly fixed to the single core wire and the twisted wire.

Further, in the connecting method of the single core electric wire to the stranded electric wire according to one aspect of the present invention, the tubular joint terminal has the tapered parts which are formed in tapered shapes so as to enlarge the inside diameter outward of the tube from the inner part of the tube in the direction of the axis. Accordingly, the single core wire and the twisted wire can be easily inserted into the tube of the tubular joint terminal.

DETAILED DESCRIPTION OF THE EXEMPLARY EMBODIMENTS

Figure 1:
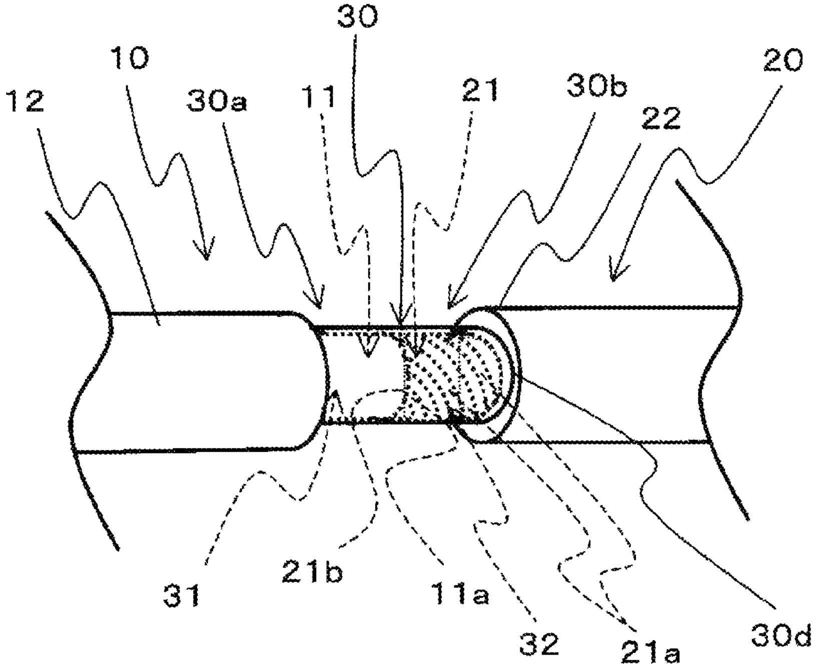
FIG. 1 is a perspective view showing a connecting structure of a single core electric wire and a stranded electric wire which are connected together by a connecting method of a single core electric wire to a stranded electric wire according to a first exemplary embodiment of the present invention.

Now, an exemplary embodiment of a connecting method of a single core electric wire to a stranded electric wire according to the present invention will be described below in detail by referring to the drawings.

[First Exemplary Embodiment]

Figure 2:
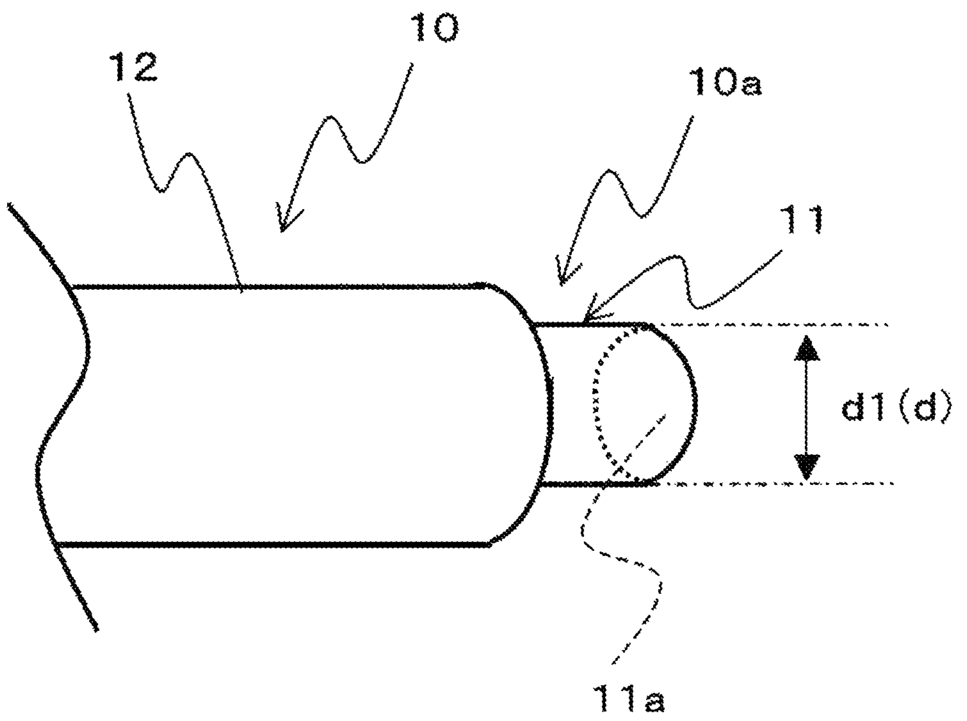
FIG. 2 is an enlarged perspective view of the single core electric wire shown in FIG. 1.
Figure 3:
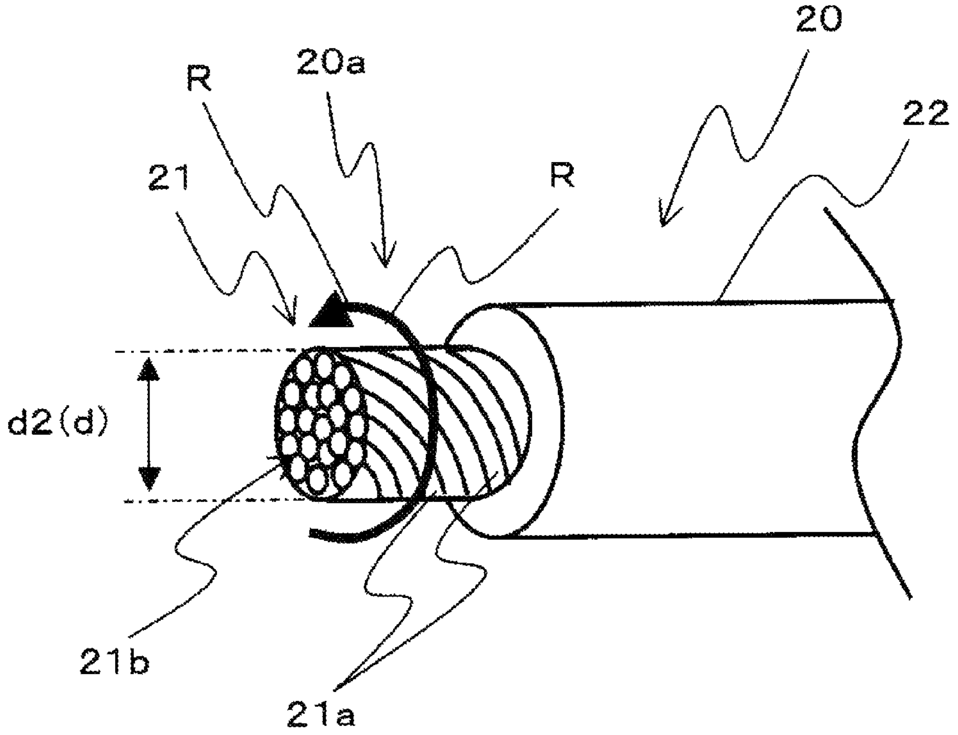
FIG. 3 is an enlarged perspective view of the stranded electric wire shown in FIG. 1.
Figure 4:
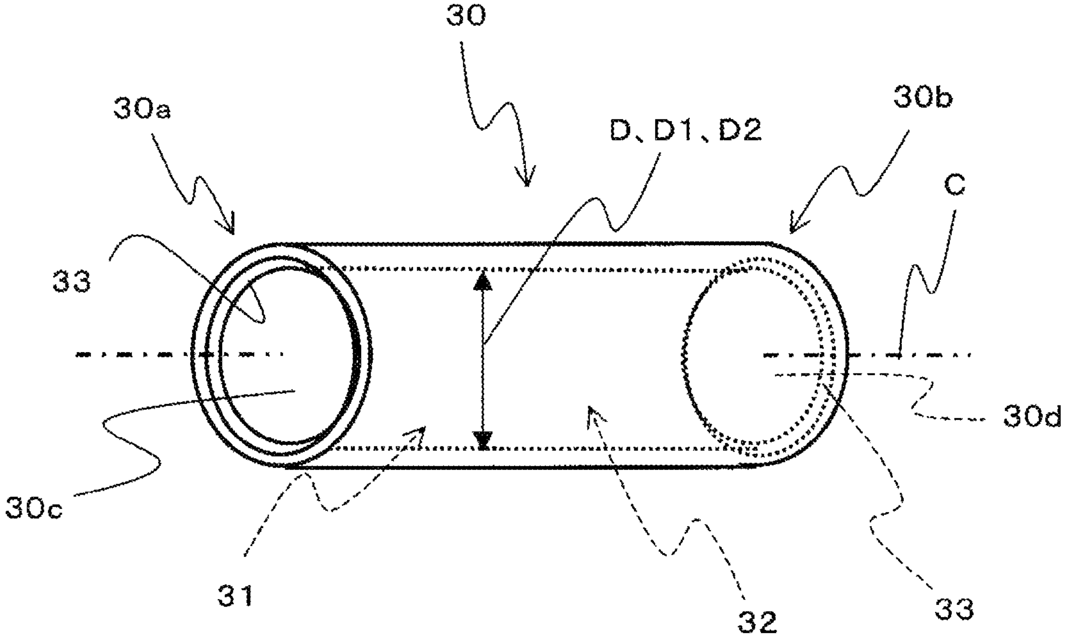
FIG. 4 is an enlarged perspective view of a tubular joint terminal shown in FIG. 1.
Figure 5:
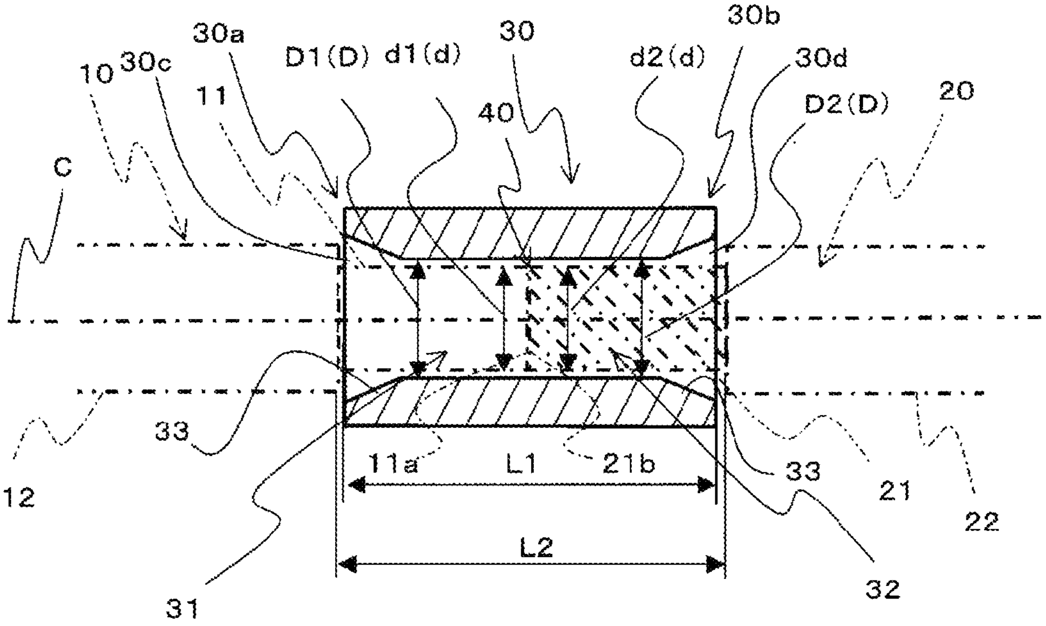
FIG. 5 is a diagram in which the single core electric wire and the stranded electric wire are virtually arranged in a sectional view of the tubular joint terminal shown in FIG. 4.

FIG. 1 is a perspective view showing a connecting structure of a single core electric wire 10 and a stranded electric wire 20 which are connected together by a connecting method of a single core electric wire 10 to a stranded electric wire 20 according to a first exemplary embodiment of the present invention. FIG. 2 is an enlarged perspective view of the single core electric wire 10 shown in FIG. 1. FIG. 3 is an enlarged perspective view of the stranded electric wire 20 shown in FIG. 1. FIG. 4 is an enlarged perspective view of a tubular joint terminal 30 shown in FIG. 1. FIG. 5 is a diagram in which the single core electric wire 10 and the stranded electric wire 20 are virtually arranged in a sectional view of the tubular joint terminal 30 shown in FIG. 4.

The connecting method of the single core electric wire 10 to the stranded electric wire 20 according to the first exemplary embodiment of the present invention includes a tube inserting process that a single core wire 11 and a twisted wire 21 are respectively inserted from openings 30*c* and 30*d* of end parts 30*a* and 30*b* of the tubular joint terminal 30 and a metallic bond process that an end face 11*a* of the single core wire 11 is allowed to come into contact under pressure with an end face 21*b* of the twisted wire 21 and the single core electric wire 10 is rotated in a twisting direction R of the twisted wire 21 to metallically bond the end face 11*a* of the single core wire 11 to the end face 21*b* of the twisted wire 21.

Initially, the well-known single core electric wire 10 and the stranded electric wire 20 will be described.

As shown in FIG. 2, the single core electric wire 10 is an electric wire with the single core wire 11 made of a conductor of aluminum alloy covered with an insulating coat part 12. In the single core electric wire 10, the insulating coat part 12 of an end part 10*a* of the single core electric wire 10 is peeled to expose the single core wire 11 from the insulating coat part 12.

As the single core electric wire 10 used in the first exemplary embodiment, the single core electric wire having a diameter d is used in which a diameter d1 of the single core wire 11 is equal to a diameter d2 of the twisted wire 21.

The stranded electric wire 20 is an electric wire having the twisted wire 21 formed by twisting a plurality of element wires 21*a* made of conductors of aluminum alloy along the prescribed twisting direction R as shown by a direction of an arrow mark in FIG. 3 which is covered with an insulating coat part 22. In the stranded electric wire 20, the insulating coat part 22 of an end part 20*a* of the stranded electric wire 20 is peeled to expose the twisted wire 21 from the insulating coat part 22.

Now, the tubular joint terminal 30 will be described below.

The tubular joint terminal 30 is an integrally formed tubular member made of a conductor of copper alloy. As shown in FIG. 4 and FIG. 5, in the tubular joint terminal 30, a single core wire inserting part 31 is formed which has an inside diameter D1 a little larger than the diameter d1 of the single core wire 11 from the one end part 30*a* to a prescribed position in an interior side in a direction of an axis C and a twisted wire inserting part 32 is formed which has an inside diameter D2 a little larger than the diameter d2 of the twisted wire 21 from the other end part 30*b* to the single core wire inserting part 31 in the interior side in the direction of the axis C.

In the first exemplary embodiment, since the diameter d1 of the single core wire 11 is equal to the diameter d2 of the twisted wire 21 as a diameter d, the tubular terminal joint 30 has the inside diameter D a little larger than the diameter d of the single core wire 11 and the twisted wire 21. Namely, an inner tube part of the tubular joint terminal 30 is formed so as to have the prescribed inside diameter D along the direction of the axis C.

Further, a length L1 of the tubular joint terminal 30 in the direction of the axis C is set to be shorter than a length L2 obtained by adding the lengths of the single core wire 11 and the twisted wire 21 which are exposed. Therefore, when the single core wire 11 and the twisted wire 21 are respectively inserted into the tube of the tubular joint terminal from the openings 30*c* and 30*d* of both the end parts 30*a* and 30*b*, the single core wire 11 and the twisted wire 21 can allow their end faces 11*a* and 21*b* to abut on each other in the tubular joint terminal. Further, since the tubular joint terminal 30 is the integrally formed tubular member, an outer periphery of a metal connecting part 40 is covered without a seam to protect the metal connecting part 40.

Further, since the tubular joint terminal 30 has the inside diameter D larger than the diameter d of the single core wire 11 and the twisted wire 21, the single core wire 11 or the twisted wire 21 can rotate on the axis in the tubular joint terminal. Further, since the inside diameter D is slightly larger than the diameter d of the single core wire 11 and the twisted wire 21, namely, substantially equal to the diameter d of the single core wire 11 and the twisted wire 21, a movement of the single core wire 11 and the twisted wire 21 in a diametrical direction is regulated.

Further, the tubular joint terminal 30 has tapered parts 33 in both the end parts 30*a* and 30*b* which are formed in tapered shapes so as to enlarge the inside diameter outward of the tube from the inner part of the tube in the direction of the axis C. Such tapered parts 33 have a guide function when the single core wire 11 and the twisted wire 21 are inserted into the tube of the tubular joint terminal 30. The single core wire 11 and the twisted wire 21 are easily inserted into the tube by the tapered parts 33.

As the tubular joint terminal 30, the tubular joint terminal having the tapered parts 33 is exemplified. However, the present invention is not limited thereto and the tubular joint terminal 30 may be formed in such a way that a fixed inside diameter is formed to both the end faces of the tubular joint terminal 30 without forming the tapered parts 33.

Here, by referring to FIG. 6A to FIG. 7C, a procedure of the connecting method of the single core electric wire 10 to the stranded electric wire 20 will be described below. FIG. 6A to FIG. 7C are diagrams showing procedures of the connecting method of the single core electric wire 10 to the stranded electric wire 20 according to the first exemplary embodiment of the present invention.

Figure 6A:
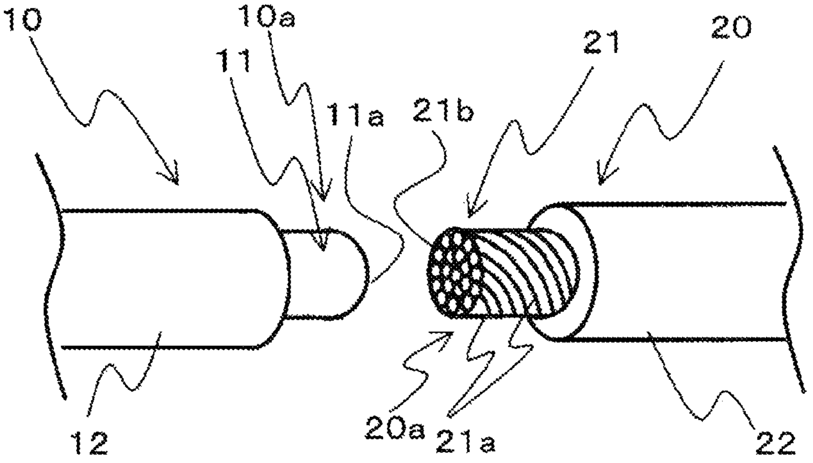
FIGS. 6A to 6C are diagrams showing a procedure of the connecting method of the single core electric wire to the stranded electric wire according to the first exemplary embodiment of the present invention.
Figure 7A:
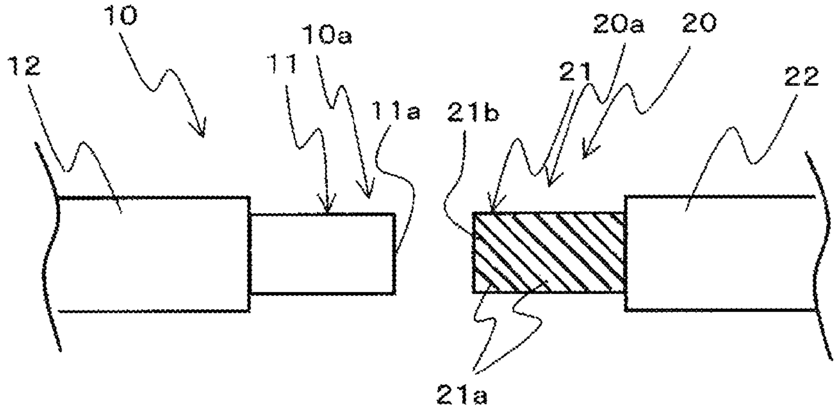
FIGS. 7A to 7C are diagrams showing a procedure of the connecting method of the single core electric wire to the stranded electric wire according to the first exemplary embodiment of the present invention.

Initially, an operator peels the insulating coat parts 12 and 22 respectively of the end parts 10*a* and 20*a* of the single core electric wire 10 and the stranded electric wire 20 to expose the single core wire 11 and the twisted wire 21 (see FIG. 6A and FIG. 7A).

Figure 6B:
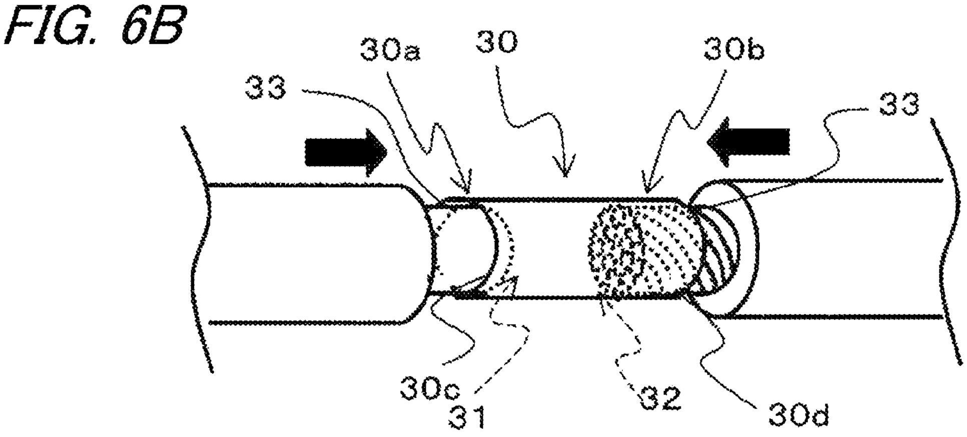
Figure 7B:
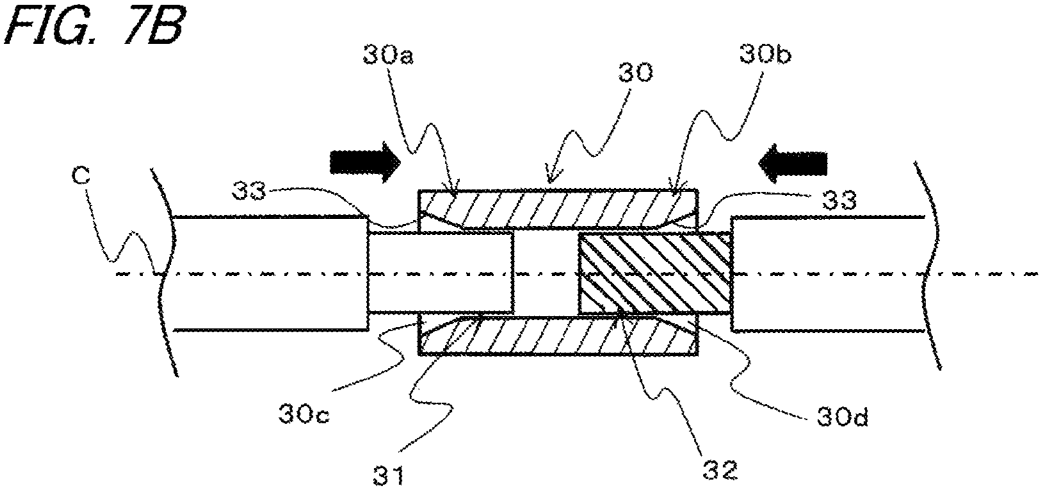

Then, the operator inserts the single core wire 11 and the twisted wire 21 respectively into the tube from the openings 30*c* and 30*d* of the end parts 30*a* and 30*b* of the tubular joint terminal 30 (see FIG. 6B and FIG. 7B). At this time, the single core wire 11 and the twisted wire 21 are guided by the tapered parts 33 and smoothly inserted into the tube.

Figure 6C:
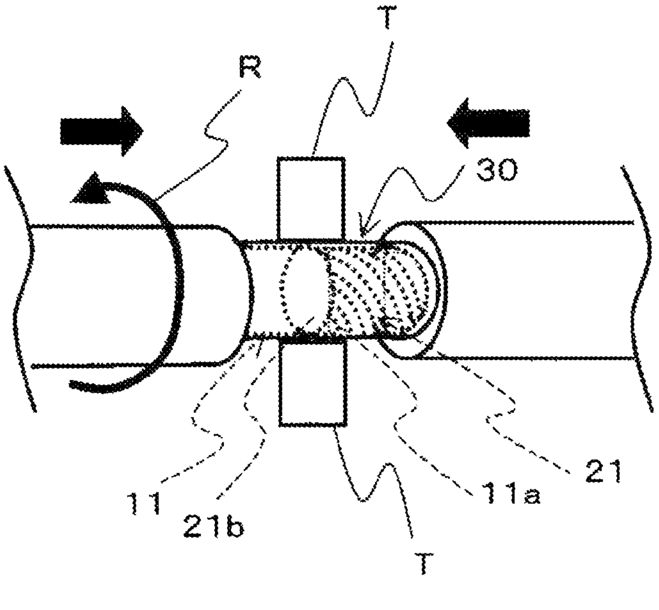
Figure 7C:
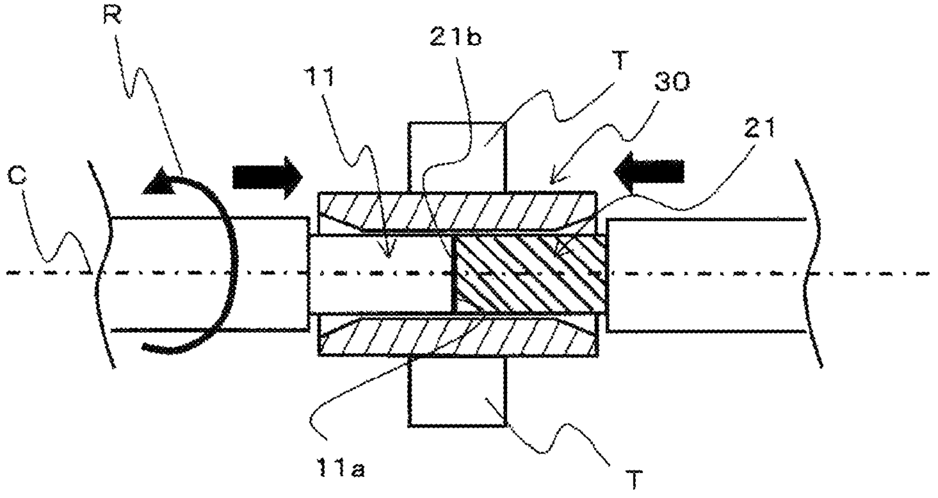

After that, under a state that the tubular joint terminal 30 is fixed by using a fixing jig T by the operator, the end face 11*a* of the single core wire 11 is allowed to come into contact under pressure with the end face 21*b* of the twisted wire 21 and the single core electric wire 10 is turned in the twisting direction R of the twisted wire 21 by using a turning device not shown in the drawing to metallically bond the end face 11*a* of the single core wire 11 to the end face 21*b* of the twisted wire 21 (see FIG. 6C and FIG. 7C).

In such a way, the end face 11*a* of the single core wire 11 is allowed to come into contact under pressure with the end face 21*b* of the twisted wire 21 and the single core electric wire 10 is turned at the same time. Thus, since both the end faces 11*a* and 21*b* are pressurized and heated by a frictional heat, the end face 11*a* of the single core wire 11 is metallically bonded to the end face 21*b* of the twisted wire 21.

When the single core electric wire 10 is turned, since the single core electric wire is turned in the twisting direction R, the twisted wire 21 can be prevented from being untwisted.

Further, when the single core electric wire 10 is turned, the tubular joint terminal 30 functions as a holding member which regulates the diametrical movement of the single core wire 11 and the twisted wire 21.

The connecting method of the single core electric wire to the stranded electric wire according to the first exemplary embodiment of the present invention includes the tube inserting process that the single core wire 11 and the twisted wire 21 are respectively inserted from the openings 30*c* and 30*d* of the end parts 30*a* and 30*b* of the tubular joint terminal 30 having the single core wire inserting part 31 formed which has the inside diameter D a little larger than the diameter d of the single core wire 11 from the one end part 30*a* of the tubular member to the prescribed position in the interior side in the direction of the axis C and the twisted wire inserting part 32 formed which has the inside diameter D a little larger than the diameter d of the twisted wire 21 from the other end part 30*b* to the single core wire inserting part 31 in the interior side in the direction of the axis C, and the metallic bond process that the end face 11*a* of the single core wire 11 is allowed to come into contact under pressure with the end face 21*b* of the twisted wire 21 and the single core electric wire 10 is rotated in the twisting direction R of the twisted wire 21 to metallically bond the end face 11*a* of the single core wire 11 to the end face 21*b* of the twisted wire 21. Accordingly, since the single core wire 11 is metallically bonded to the twisted wire 21, a contact resistance can be prevented from increasing.

Further, in the connecting method of the single core electric wire 10 to the stranded electric wire 20 according to the first exemplary embodiment of the present invention, since the tubular joint terminal 30 is the integrally formed tubular member, the outer periphery of the metal connecting part 40 is covered without a seam. Thus, the metal connecting part 40 can be assuredly protected.

Further, in the connecting method of the single core electric wire to the stranded electric wire according to the first exemplary embodiment of the present invention, the tubular joint terminal 30 has the tapered parts 33 which are formed in tapered shapes so as to enlarge the inside diameter outward of the tube from the inner part of the tube in the direction of the axis C. Accordingly, the single core wire 11 and the twisted wire 21 can be easily inserted into the tube of the tubular joint terminal.

MODIFIED EXAMPLE

Figure 8:
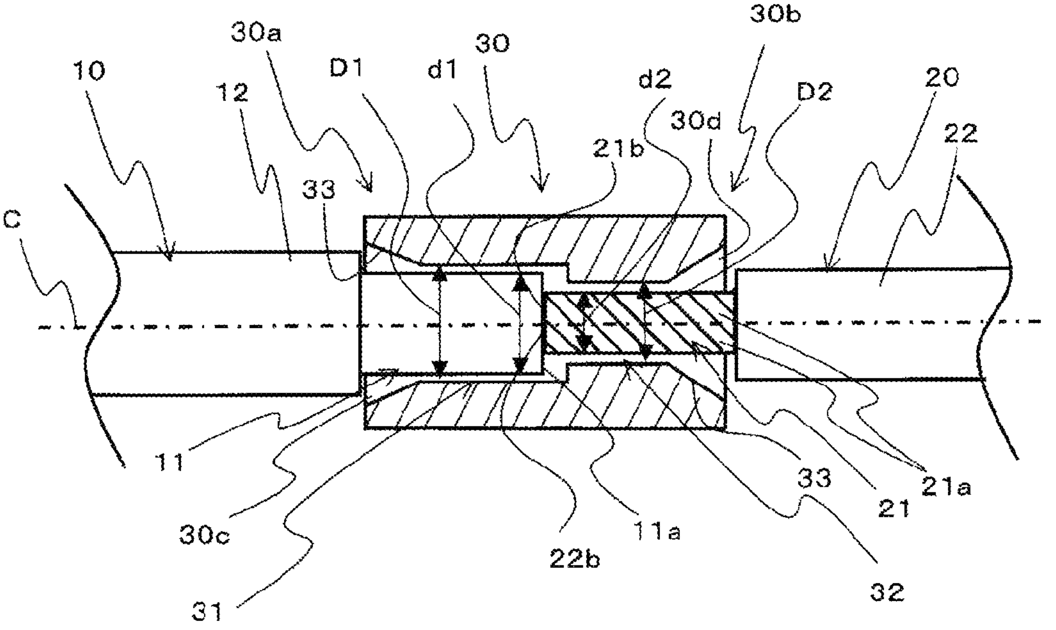
FIG. 8 is a diagram showing a connecting structure of a single core electric wire and a stranded electric wire which are connected together by a connecting method of a single core electric wire to a stranded electric wire according to a modified example of the first exemplary embodiment of the present invention and a tubular joint terminal in section.

Now, a modified example of the connecting method of the single core electric wire 10 to the stranded electric wire 20 according to the first exemplary embodiment of the present invention will be described below. FIG. 8 is a diagram showing a connecting structure of a single core electric wire 10 and a stranded electric wire 20 which are connected together by a connecting method of a single core electric wire 10 to a stranded electric wire 20 of the modified example of the first exemplary embodiment according to the present invention and a tubular joint terminal 30 in section.

The same component parts as those of the exemplary embodiment are designated by the same reference numerals.

The connecting method of the single core electric wire 10 to the stranded electric wire 20 of the modified example is different from the connecting method of the single core electric wire to the stranded electric wire of the first exemplary embodiment in view of a point that a diameter d1 of a single core wire 11 is larger than a diameter d2 of a twisted wire 21.

In the tubular joint terminal 30, a single core wire inserting part 31 has an inside diameter D1 a little larger than the diameter d1 of the single core wire 11 from one end part 30*a* of a tubular member to a prescribed position in an interior side in a direction of an axis C and a twisted wire inserting part 32 has an inside diameter D2 a little larger than the diameter d2 of the twisted wire 21 from the other end part 30*b* to the single core wire inserting part 31 in the interior side in the direction of the axis C.

When the single core wire 11 and the twisted wire 21 are inserted into the tube of the tubular joint terminal 30 of the modified example, an end face 21*b* of the twisted wire 21 is located in the single core wire inserting part 31.

The connecting method of the single core electric wire 10 to the stranded electric wire 20 according to the modified example has the same effects as those of the connecting method of the single core electric wire 10 to the stranded electric wire 20 of the first exemplary embodiment.

As exemplified in the connecting method of the single core electric wire 10 to the stranded electric wire 20 according to the modified example, the diameter d1 of the single core wire 11 is larger than the diameter d2 of the twisted wire 21. However, the present invention is not limited thereto. Namely, the diameter d2 of the twisted wire 21 may be larger than the diameter d1 of the single core wire 11. In this case, inside diameters D1 and D2 of the tubular joint terminal 30 are set so as to meet the diameters d1 and d2 of the single core wire 11 and the twisted wire 21.

[Second Exemplary Embodiment]

Now, a connecting method of a single core electric wire 10 to a stranded electric wire 20 according to a second exemplary embodiment of the present invention will be described below by referring to FIGS. 9A to 9D. FIGS. 9A to 9D are diagrams showing a procedure of the connecting method of the single core electric wire 10 to the stranded electric wire 20 according to the second exemplary embodiment of the present invention.

The same component parts as those of the first exemplary embodiment are designated by the same reference numerals.

In the connecting method of the single core electric wire 10 to the stranded electric wire 20 of the second exemplary embodiment, since a process that insulating coat parts 12 and 22 of end parts 10*a* and 20*a* of the single core electric wire 10 and the stranded electric wire 20 are respectively peeled to a process that an end face 11*a* of a single core wire 11 is metallically bonded to an end face 21*b* of a twisted wire 21 (FIG. 9A to FIG. 9C) are the same as those of the first exemplary embodiment, an explanation thereof will be omitted.

In the connecting method of the single core electric wire 10 to the stranded electric wire 20 according to the second exemplary embodiment of the present invention, after the end face

Figure 9A:
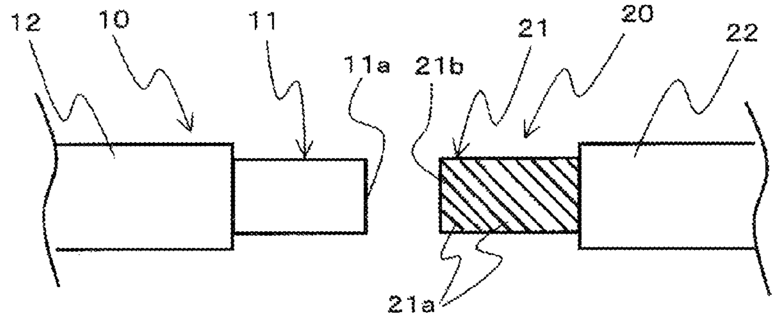
FIGS. 9A to 9D are diagrams showing a procedure of a connecting method of a single core electric wire to a stranded electric wire according to a second exemplary embodiment of the present invention.
Figure 9B:
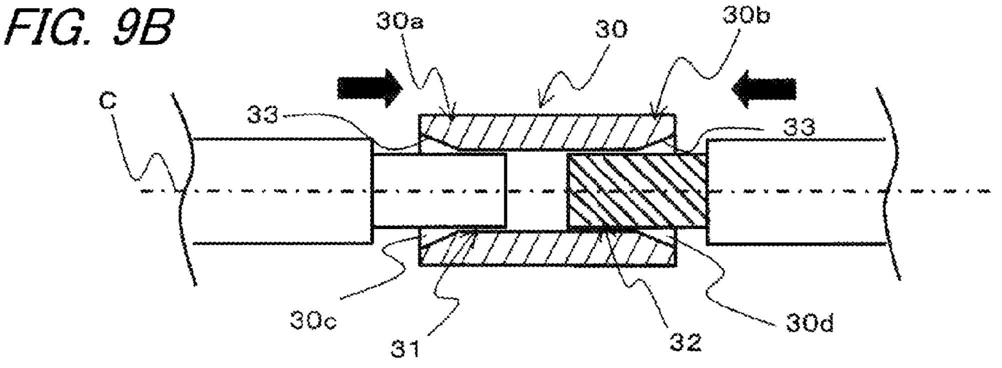
Figure 9C:
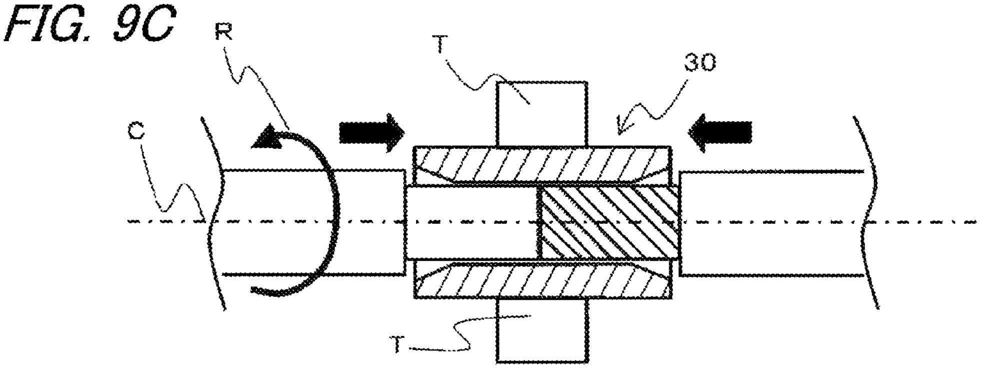
Figure 9D:
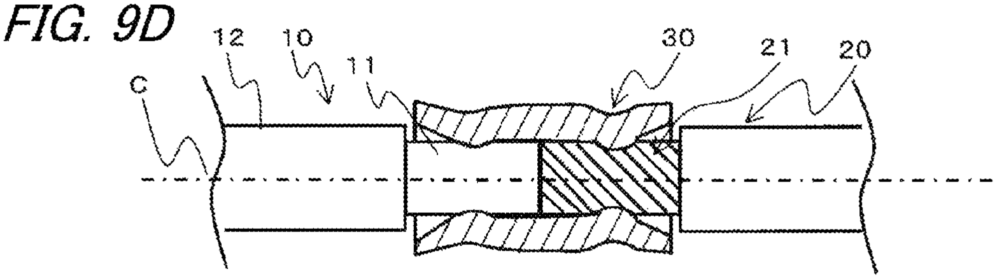

11*a* of the single core wire 11 is metallically bonded to the end face 21*b* of the twisted wire 21, a tubular joint terminal 30 is caulked by a caulking jig not shown in the drawing (see FIG. 9D).

The connecting method of the single core electric wire 10 to the stranded electric wire 20 according to the second exemplary embodiment of the present invention can achieve the same effects as those of the connecting method of the single core electric wire 10 to the stranded electric wire 20 of the first exemplary embodiment and strongly fix the tubular joint terminal 30 to the single core wire 11 and the twisted wire 21.

In the connecting method of the single core electric wire 10 to the stranded electric wire 20 according to the second exemplary embodiment of the present invention, as the tubular joint terminal 30, an integrally formed tubular member is exemplified as in the first exemplary embodiment. However, the tubular joint terminal 30 may be merely formed to be tubular and slotted so as to be easily caulked.

In the connecting method of the single core electric wire 10 to the stranded electric wire 20 according to the first and second exemplary embodiments of the present invention, the single core electric wire 10 which is rotated in the twisting direction R is exemplified. However, the present invention is not limited thereto. Namely, the stranded electric wire 20 may be rotated in an opposite direction to the twisting direction R, or the single core electric wire 10 may be rotated in the twisting direction R and the stranded electric wire 20 may be rotated in the opposite direction to the twisting direction R.

It is apparent that various modifications can be made in the invention within a scope not deviating from the gist of the invention.

The present invention is useful for providing a connecting method of a single core electric wire to a stranded electric wire which can prevent a contact resistance from increasing.

What is claimed is:

1. A connecting method of a single core electric wire to a stranded electric wire by which a single core electric wire having a single core wire covered with an insulating coat part is connected to a stranded electric wire having a twisted wire formed by twisting a plurality of element wires which is covered with an insulating coat part, the connecting method of the single core electric wire to the stranded electric wire including:

a tube inserting process in which the single core wire and the twisted wire are respectively inserted from openings of end parts of a tubular joint terminal having a single core wire inserting part which has an inside diameter larger than a diameter of the single core wire from one end part of the tubular joint terminal to a prescribed position in an interior side in a direction of an axis of the tubular joint terminal, and a twisted wire inserting part which has an inside diameter larger than a diameter of the twisted wire from the other end part to the single core wire inserting part in the interior side in the direction of the axis of the tubular joint terminal; and a metallic bond process in which an end face of the single core wire is allowed to come into contact under pressure with an end face of the twisted wire, with the single core electric wire being rotated in a twisting direction of the twisted wire, or the stranded electric wire being rotated in an opposite direction to the twisting direction, or the single core electric wire being rotated in the twisting direction and the stranded electric wire is rotated in the opposite direction to the twisting direction, to metallically bond the end face of the single core wire to the end face of the twisted wire.

2. A connecting method of a single core electric wire to a stranded electric wire according to claim 1, wherein the tubular joint terminal is an integrally formed tubular member.

3. A connecting method of a single core electric wire to a stranded electric wire according to claim 1, wherein a terminal caulking process is further included in which the tubular joint terminal is caulked after the metallic bond process.

4. A connecting method of a single core electric wire to a stranded electric wire according to claim 1, wherein the tubular joint terminal has tapered parts at both end parts which are formed in tapered shapes so as to enlarge an inside diameter outward of the tube from an inner part of the tube in a direction of an axis.

* * * * *